March 16, 1965 IOSIF DRIMUS ETAL 3,173,961
PROCESS FOR THE SEPARATION OF THE PRODUCTS OBTAINED THROUGH
THE NITRATION OF CYCLOHEXANE IN GASEOUS PHASE
Filed June 25, 1963
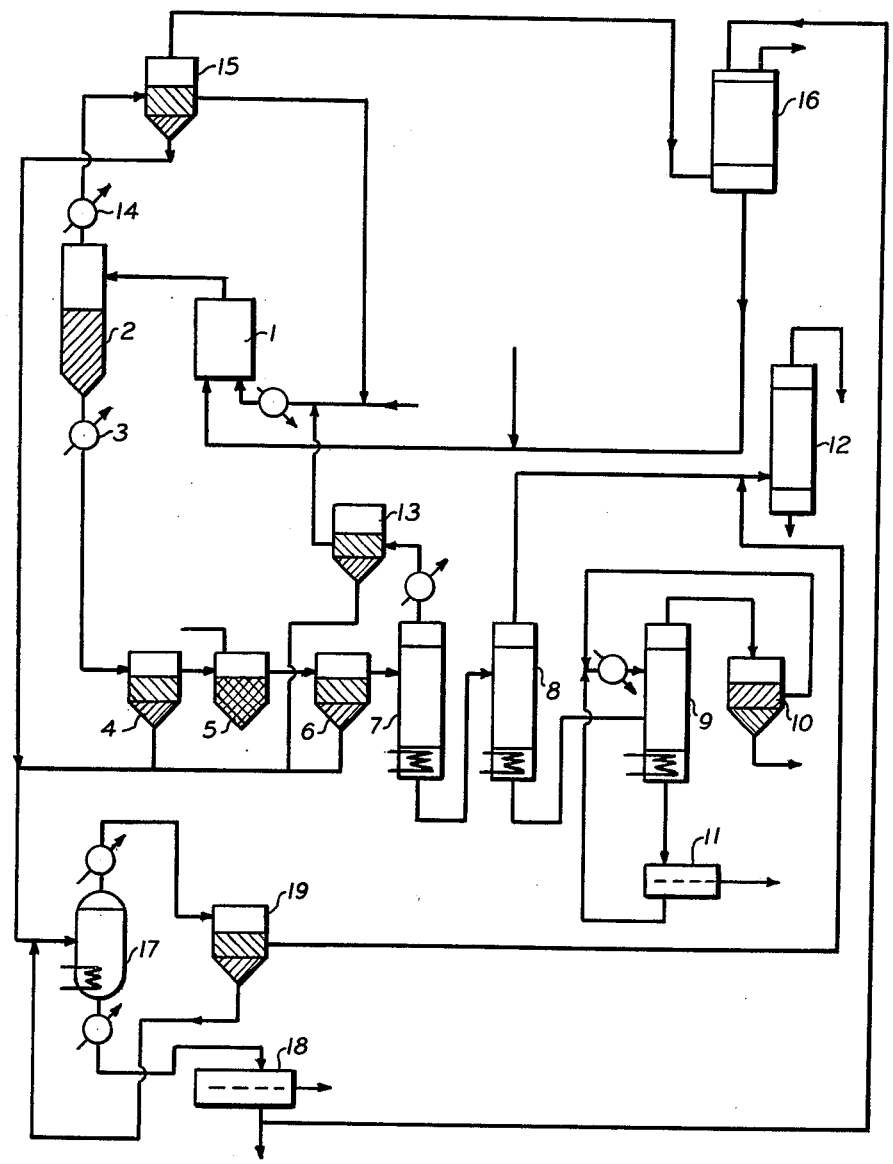
INVENTORS
IOSIF DRIMUS
IOAN VELEA
CLAUDIU GHEORGHE MATASA
I. CONSTANTIN CRISTESCU
BY Arthur O. Klein
ATTORNEY.

United States Patent Office 3,173,961
Patented Mar. 16, 1965

3,173,961
PROCESS FOR THE SEPARATION OF THE PRODUCTS OBTAINED THROUGH THE NITRATION OF CYCLOHEXANE IN GASEOUS PHASE
Iosif Drimus, Ioan Velea, Claudiu Gheorghe Matasa, and I. Constantin Cristescu, Bucharest, Rumania, assignors to Ministerul Industriei Petrolului si Chimiei, Bucharest, Rumania
Filed June 25, 1963, Ser. No. 290,424
Claims priority, application Rumania, June 27, 1962, 45,508
7 Claims. (Cl. 260—644)

This invention relates to a process for separation of the products obtained through the nitration of cyclohexane in gaseous phase.

The products of the cyclohexane nitration in gaseous phase are constituted of gases and liquids; the latter separate into an upper organic layer and a lower aqueous layer.

The organic layer which comprises nitrocyclohexane—a valuable intermediary in the synthesis of caprolactam—contains also unreacted cyclohexane, cyclohexanol, cyclohexanone, fatty acids and esters etc. and, unlike similar products obtained through the nitration in the liquid phase of cyclohexane also, contains nitroalkanes $C_3$-$C_5$ in appreciable amounts. This fact complicates the separation of the nitrocyclohexane owing to its similar properties with those of the nitroalkanes. For the separation of the nitrocyclohexane various methods have been employed based, either upon the extraction or upon the fractional distillation of the different compounds. There has been proposed the extraction of the nitrocyclohexane with alkalies followed by a regeneration of the nitroderivatives with organic acids—a costly process. This method gives corresponding results only in case that the nitroderivatives obtained by extraction are separated by fractional distillation, in which case are realized separation yields under 90%.

When the fractional distillation of the organic layer is effectuated in two steps—the first step, at atmospheric pressures for the separation of cyclohexane and the second step in vacuum for the distillation of the medium fraction and of the nitrocyclohexane—the disadvantage is presented of an excessive formation of resinification compounds which clog the column. The resinification takes place owing to the fact that the nitrocyclohexane is sensitive to high temperatures leading to resinification. This phenomenon takes place even in case of applying the rectification in a continuous circuit even in a relative advanced vacuum because the separation of the nitrocyclohexane from the nearest fraction, fatty acids, necessitates 40 theoretical bubble plates which results in a high pressure drop and therefore an important increase of temperature.

Another process utilizes the entrainment with steam of the organic layer resulting after the condensation of the nitration products. In this way it is possible to collect in a first fraction the cyclohexane together with some water, and in another fraction the nitro-cyclohexane together with other organic products and water. The fraction distilling above 98° C. contains approx. 80% nitrocyclohexane contaminated by products from the medium fraction. A part of the nitrocyclohexane is carried away into the medium fraction which reduces very much the yield, but on the other hand the resinifications are minimal. The heavy fraction is furthermore submitted to a rectification under vacuum, the obtained distillate containing the various fractions including nitrocyclohexane. The rectification of the nitrocyclohexane follows as in the previous processes i.e. accompanied by the same resinifications which produce a clogging of the column.

Another process utilizes the selective extraction with nitric acid of 90% which by dilution up to 70% has the property to release a good part of the extracted nitroderivatives. As in the case of the extraction with alkalies this process necessitates also a separation of the nitroderivatives by fractional distillation under vacuum. This process presents also a special danger as the fact is known that the nitroderivatives dissolved in nitric acid are explosive.

The present invention permits the separation of nitrocyclohexane from the mixture obtained through the nitration of cyclohexane in gaseous phase without having to distill said mixture and eliminating in this way in a good part the resinifications and improving substantially the yield.

According to the present invention the products of the reaction in gaseous phase leaving the nitration reactor are submitted to a partial condensation yielding a light gaseous fraction, which contains the greatest part of the unreacted cyclohexane and of the water, besides another condensed fraction composed of a small quantity of cyclohexane and products with high boiling point together with a still further part of the water. The light fraction is then condensed and separated in two layers; after adding fresh cyclohexane, the organic layer is then recycled into the nitration step.

The heavy fraction is also separated and the organic layer is treated with an alkaline aqueous solution for the purpose of removing the organic acidity and also the fatty acids but not the nitroderivatives. After effectuating the treatment, the organic layer is separated from a formed aqueous layer and submitted to a continuous distillation at atmospheric pressure for removing cyclohexane and water. The heavy fraction is then submitted to a continuous rectification under a vacuum of approx. 10 mm. Hg in a column with a relative reduced number of theoretical bubble plates for separating only the fractions which distill before the nitrocyclohexane. This latter together with the resins are collected at the column base and are submitted either to a distillation with steam in a column with a few bubble plates at atmospheric pressure or under vacuum or to a treatment with alkalies to obtain the sodium salt of the nitrocyclohexane, used per se for different syntheses.

As well in the one case as in the other the obtained product is pure and the resinifications are in a reduced number. The result of the addition of surface active agents during the distillation with steam is a dispersion of the small amount of the produced resins in the water so that these can be easily removed from the column without adhering to the walls. The fraction which distills before the nitrocyclohexane and which is composed of nitroalkanes, cyclohexanol, cyclohexanone, esters can be separated by fractional distillation in another column or can be employed per se as solvent. The waste waters obtained by decantation of the acid reaction products as well as those obtained by the treatment with alkaline solution are mixed and neutralized, and then are submitted to a distillation to release the dissolved nitroalkanes as well as the extracted organic acids.

The following is a specific example illustrative of the invention, reference being had to the diagram of the attached drawing.

If it is not desired to apply the whole process, it is sufficient to apply only that portion of the system which permits the realization of the required result.

The mixture of vapours and gases obtained through the nitration in the gaseous phase of the cyclohexane at atmospheric pressure in the reactor 1 passes with a temperature of 350° C. into a partial condensation chamber 2 where takes place a separation of the light fraction passing in its greatest part in gaseous phase into a condenser 14 and thence to a separator 15 where the upper layer is separated and recycled to the reactor 1 nitration. The heavy liquid phase with a temperature of 85° C. is passed through a heat exchanger 3 and thence to a separator 4, in which takes place the separation of an organic layer and of an aqueous layer. The organic layer containing 65% nitroderivatives, 14% cyclohexanol, 8% cyclohexanone, 10% fatty acids and 3% esters, is treated in a reaction vessel 5 provided with a stirrer and condenser with a solution of 10% sodium carbonate in a ratio of 1:1 by volume after which it is allowed to separate in the separator 6.

The separated organic layer from separator 6 is fed to the continuous column 7 with approx. 3 theoretical bubble plates, the heating being effectuated either in the column or before the entrance thereto at approx. 100° C., so that the cyclohexane and the contained water—about 10% of the total volume—will distil through the column head, after which it is condensed and separated in the separator 13. The organic layer from separator 13 is reintroduced into the nitration step as shown whereas the product obtained through the column bottom is continuously fed into the vacuum rectification column 8.

The continuous rectification column 8 operates under a vacuum of 10 mm. Hg and has approx. 15 theroretical bubble plates; the purpose is to separate the medium fraction is a volume of approx. 25%—the fraction which distils up to 75° C. and which contains the lower alkanes, cyclohexanol, cyclohexanone and esters. This medium fraction is conducted into another discontinuous column 12 where the separation of byproducts takes place.

The residue obtained in column 8 having a temperature of approx. 100° C. and containing over 90% nitrocyclohexane is introduced into the column 9 for the distillation with steam which operates continuosly and has an efficiency of approx. 10 theoretical bubble plates. The steam results from evaporation of the water obtained as upper layer in the separator 10 and as filtrate in the separator 11; this water contains about 0.1% in weight quaternary ammonium salt of fatty amine as surface active agent which is added, by means not shown, to the stream of products entering column 9. Reference has already been made to the use of surface-active agents (column 2, line 58 above) for preventing quantities of resins formed in the reaction from separating out upon the walls of the evaporating column. It will be understood that many other surface-active agents might likewise be used including both anionic and nonionic agents, as for example, alkylaryl-sulphonates.

Through the head of column 9 is obtained nitrocyclohexane which condenses and is separated as lower layer in the separator 10 with a purity above 99% (boiling point 98.5° C. at 25 mm. Hg, density of 20° C. 1.069 and $n_D^{20}=1.463$). Through the column bottom is evacuated water which contains dispersed resins; these latter are separated to permit the recycling of the water containing surface active agents.

The acid waters coming from the separators 4, 13, 15, are mixed with sodium carbonate solution obtained from the separator 6 for giving a neutral mixture which is submitted to a distillation at atmospheric pressure in the still 17. The fraction separated up to 100° C. is formed of organic products and water. The first are obtained in an amount of 10 kg. per cubic meter processed water and consist of cyclohexane, fatty acids, nitroalkanes, cyclohexanol, cyclohexanone etc. This mixture is separated from the water in the separator 19 and is also introduced into the column 12. The residual waters containing discarboxylic acids which crystallize are separated through the filter 18 and are recycled into the absorption of the nitrogen oxides. A part of the water is purged.

The gases separated from the separator 16, containing about 50% nitrogen oxide, 20% nitrogen, 30% oxides of carbon, are processed for obtaining nitric acid in the column 16.

The advantages presented by this process are the following:

A separation yield of 95% in respect of nitrocyclohexane;

Saving of caloric energy, the greatest part of the reaction product distilling owing to the high temperature at which takes place the nitration process;

A maximum value of the byproducts owing to the continous recycling system;

Utilization of a small number of bubble plates and reduction of the distillation under vacuum only to the separation of the medium fraction;

Obtaining of a sufficiently pure nitrocyclohexane for a subsequent processing without it being submitted to a rectification which process is accompanied by resinifications;

Avoiding of the clogging of the columns by limiting the formation of resins and suitably removing those already formed;

Avoiding the utilization of auxiliary chemical products thus reducing the cost.

Although a preferred example of the invention was described it will be understood that modifications may be made within the spirit and scope of the appended claims. It will be understood that there is no intention to include unmentioned ingredients other that minor impurities.

We claim:

1. A process of separating products resulting from the nitration of cyclohexane in the gaseous phase in a reactor to produce nitrocyclohexane, comprising the following steps:
   (a) subjecting the mixture of products which issue from the reactor to a partial condensation to separate therefrom the vapor of unreacted cyclohexane and a condensate containing the nitrocyclohexane and other products;
   (b) separating by gravity said condensate into an organic fraction and a relatively heavier aqueous fraction, said organic fraction containing inter alia nitro derivatives and fatty acids;
   (c) removing the fatty acids from said organic fraction by treatment with aqueous alkali to give a fraction rich in nitro derivatives including nitrocyclohexane; and
   (d) recovering nitrocyclohexane from said fraction rich therein by steps which include rectification under vacuum.

2. A process according to claim 1 in which step (d) calling for rectification of the fraction rich in nitrocyclohexane is carried out with the aid of steam.

3. A process according to claim 2 in which said rectification is conducted in the presence of a surface tension agent.

4. A process according to claim 1 in which step (a) is conducted at substantially atmospheric pressure.

5. A method according to claim 1 in which the treatment with aqueous alkali according to step (c) is so carried out as to remove substantially none of the nitro derivatives formed.

6. A process according to claim 1 in which step (d) includes prior to said rectification step, the step of separating out a medium fraction which includes inter alia the lower alkanes and cyclohexanol.

7. A process according to claim 1 in which aqueous fractions from steps (b) and (c) are recycled in the process.

References Cited by the Examiner

UNITED STATES PATENTS

| 2,420,938 | 5/47 | Doumani et al. | 260—644 X |
| 2,597,753 | 5/52 | Schmitz et al. | 260—644 |
| 2,719,172 | 9/55 | Nebe | 260—644 |
| 2,789,136 | 4/57 | O'Hara | 260—644 X |

FOREIGN PATENTS 722,155  12/54  Great Britain.

CARL D. QUARFORTH, *Primary Examiner.*